(12) United States Patent
Toda et al.

(10) Patent No.: US 11,183,704 B2
(45) Date of Patent: *Nov. 23, 2021

(54) FUEL CELL MODULE AND FUEL CELL SYSTEM

(71) Applicant: HONDA MOTOR CO., LTD., Tokyo (JP)

(72) Inventors: Shigeru Toda, Wako (JP); Atsushi Koizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

This patent is subject to a terminal disclaimer.

(21) Appl. No.: 16/445,845

(22) Filed: Jun. 19, 2019

(65) Prior Publication Data

US 2019/0393538 A1 Dec. 26, 2019

(30) Foreign Application Priority Data

Jun. 21, 2018 (JP) .............................. JP2018-117520

(51) Int. Cl.
*H01M 8/2475* (2016.01)
*H01M 8/0213* (2016.01)
*H01M 8/0226* (2016.01)

(52) U.S. Cl.
CPC ....... *H01M 8/2475* (2013.01); *H01M 8/0213* (2013.01); *H01M 8/0226* (2013.01)

(58) Field of Classification Search
CPC .................................................. H01M 8/2475
See application file for complete search history.

(56) References Cited

U.S. PATENT DOCUMENTS

| 8,389,172 | B2 | 3/2013 | Homma |
| 2005/0142425 | A1* | 6/2005 | Homma .............. H01M 8/2457 429/457 |
| 2011/0262841 | A1 | 10/2011 | Becker et al. |
| 2014/0080027 | A1 | 3/2014 | Poirot-Crouvezier |

FOREIGN PATENT DOCUMENTS

| JP | 2010-541146 | 12/2010 |
| JP | 2015-018622 | 1/2015 |

OTHER PUBLICATIONS

European Search Report dated Nov. 8, 2019, 7 pages.

* cited by examiner

*Primary Examiner* — Brian R Ohara
(74) *Attorney, Agent, or Firm* — Rankin, Hill & Clark LLP

(57) ABSTRACT

A fuel cell module includes a plurality of power generation cells. The plurality of power generation cells are stacked together in a circle, and a tightening load is applied to the plurality of power generation cells in a circumferential direction. Each of the plurality of power generation cells includes a V-shaped electrically conductive base plate. A first reactant gas flow field is provided between power generation cells that are adjacent to each other. A ridge protruding outward is provided in the base plate to provide the first reactant gas flow field by the ridge, and insulating material is provided on the ridge.

5 Claims, 10 Drawing Sheets

FUEL CELL MODULE AND FUEL CELL SYSTEM

CROSS-REFERENCE TO RELATED APPLICATION

This application is based upon and claims the benefit of priority from Japanese Patent Application No. 2018-117520 filed on Jun. 21, 2018, the contents of which are incorporated herein by reference.

BACKGROUND OF THE INVENTION

Field of the Invention

The present invention relates to a fuel cell module and a fuel cell system.

Description of the Related Art

Normally, a solid oxide fuel cell (SOFC) employs an oxide ion conductor such as stabilized zirconia as a solid electrolyte. An anode and a cathode are provided on both surfaces of the solid electrolyte to form an electrolyte electrode assembly. The Electrolyte electrode assembly is sandwiched between separators (bipolar plates).

In general, fuel cell modules using a solid oxide fuel cell are roughly divided into a flat plate stack type fuel cell module where predetermined numbers of electrolyte electrode assemblies and separators are stacked together (Japanese Laid-Open Patent Publication No. 2010-541146 (PCT)), and a cylindrical type fuel cell module (Japanese Laid-Open Patent Publication No. 2015-018622).

SUMMARY OF THE INVENTION

The flat plate stack type fuel cell module has structure where component parts referred to as separators are provided, and end plates provided at both ends of a stack body are provided for providing electrical connection and gas seals between power generation cells. The end plates are tightened together using bolts to apply a stacking load to the power generation cells. Therefore, a large number of component parts are required, the heat capacity is large, and it is difficult to increase the start-up speed. Further, the gas seal structure is complicated. In the cylindrical type fuel cell module, electrical connection is complicated, and it is difficult to increase the space efficiency.

The present invention has been made taking such a problem into account, and an object of the present invention is to provide a fuel cell module and a fuel cell system in which, in comparison with conventional structure, it is possible to reduce the number of component parts, easy to increase the start-up speed, simplify gas seal structure, and easy to improve the space efficiency.

According to a first aspect of the present invention, a fuel cell module includes a plurality of power generation cells each including an electrolyte electrode assembly and configured to perform power generation by utilizing a fuel gas and an oxygen-containing gas, wherein the plurality of power generation cells are stacked together in a circle and a stacking load is applied to the plurality of power generation cells in a circumferential direction, each of the plurality of power generation cells includes a V-shaped electrically conductive base plate including a first plate part and a second plate part extending in directions intersecting with each other, a first reactant gas flow field is provided between power generation cells that are adjacent to each other, among the plurality of power generation cells, to allow one of the fuel gas and the oxygen-containing gas to flow along the first reactant gas flow field, a ridge protruding outward is provided in the base plate to provide the first reactant gas flow field by the ridge, and insulating material is provided on the ridge.

According to a second aspect of the present invention, a fuel cell system includes a fuel cell module, wherein the fuel cell module includes a plurality of power generation cells each including an electrolyte electrode assembly, and configured to perform power generation by utilizing a fuel gas and an oxygen-containing gas, the plurality of power generation cells are stacked together in a circle, and a stacking load is applied to the plurality of power generation cells in a circumferential direction, each of the plurality of power generation cells includes a V-shaped electrically conductive base plate including a first plate part and a second plate part extending in directions intersecting with each other, a first reactant gas flow field is provided between power generation cells that are adjacent to each other, among the plurality of power generation cells, to allow one of the fuel gas and the oxygen-containing gas to flow along the first reactant gas flow field, a ridge protruding outward is provided in the base plate to provide the first reactant gas flow field by the ridge, and insulating material is provided on the ridge.

In the present invention, the plurality of power generation cells are stacked together in a circle. Therefore, unlike the conventional flat plate stack type fuel cell module where the stacking load is applied using the end plates and the bolts, it is possible to reduce the number of components parts, and reduce the heat capacity, and thus, increase the start-up speed. Further, since no gas seals between the power generation cells are required, it is possible to simplify the gas seal structure. Since each of the power generation cells has a V-shape, it is easy to improve the space efficiency. Further, since the insulating material is provided on the ridge formed in the base plate of the power generation cell, it is possible to provide the first reactant gas flow field and prevent short circuiting between the adjacent base plates.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of a fuel cell module and a fuel cell system according to the present invention will be described with reference to the accompanying drawings.

Figure 1:
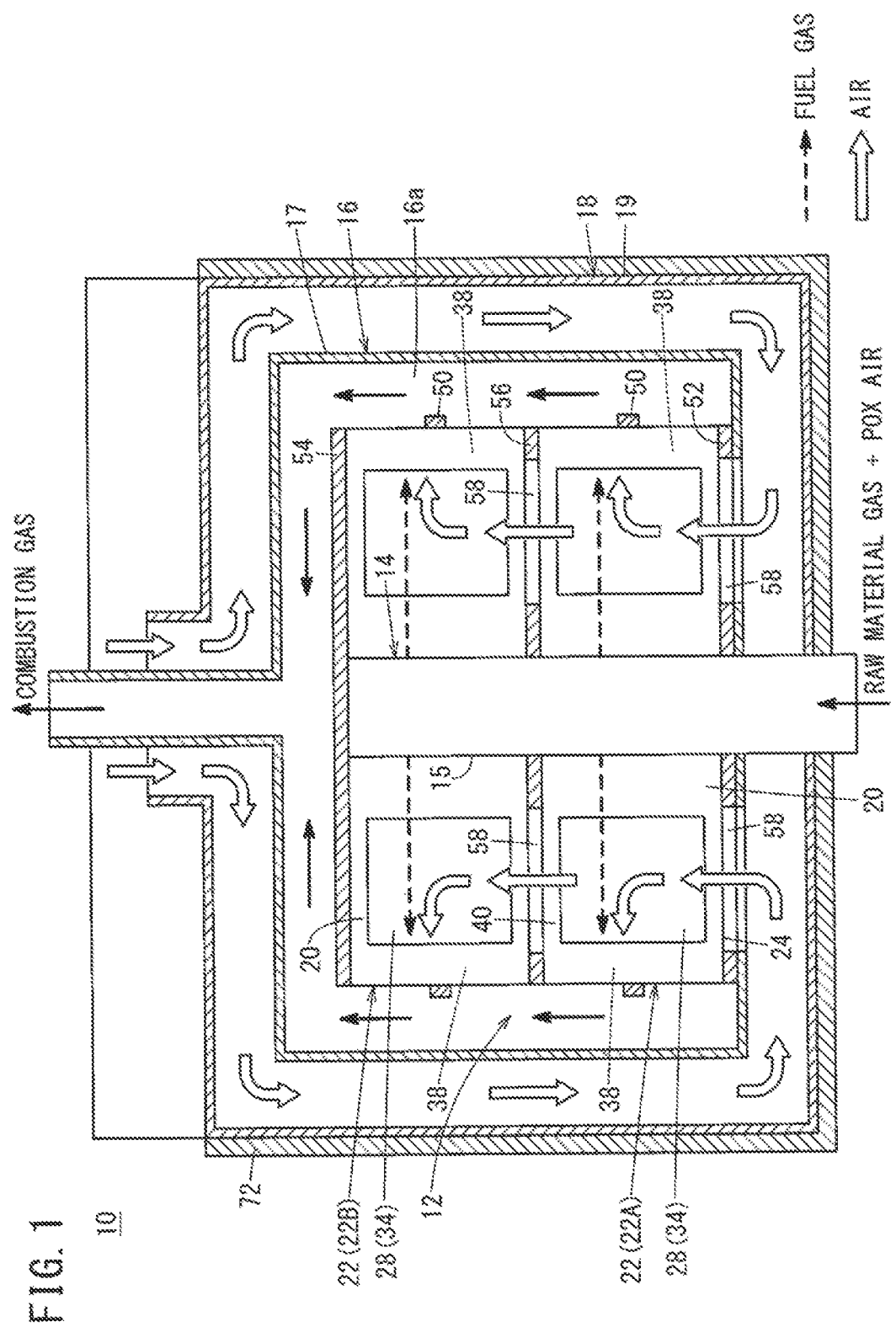
FIG. 1 is a view schematically showing structure of a fuel cell system including a fuel cell module.

A fuel cell system 10 shown in FIG. 1 shows a fuel cell module 12 for performing power generation, a reformer 14 for supplying a fuel gas to the fuel cell module 12, a combustor 16 for combusting air (oxygen-containing gas/cathode exhaust gas) and a fuel gas (anode exhaust gas) discharged from the fuel cell module 12, and a heat exchanger 18 for performing heat exchange between air and the combustion gas to preheat the air.

Figure 2:
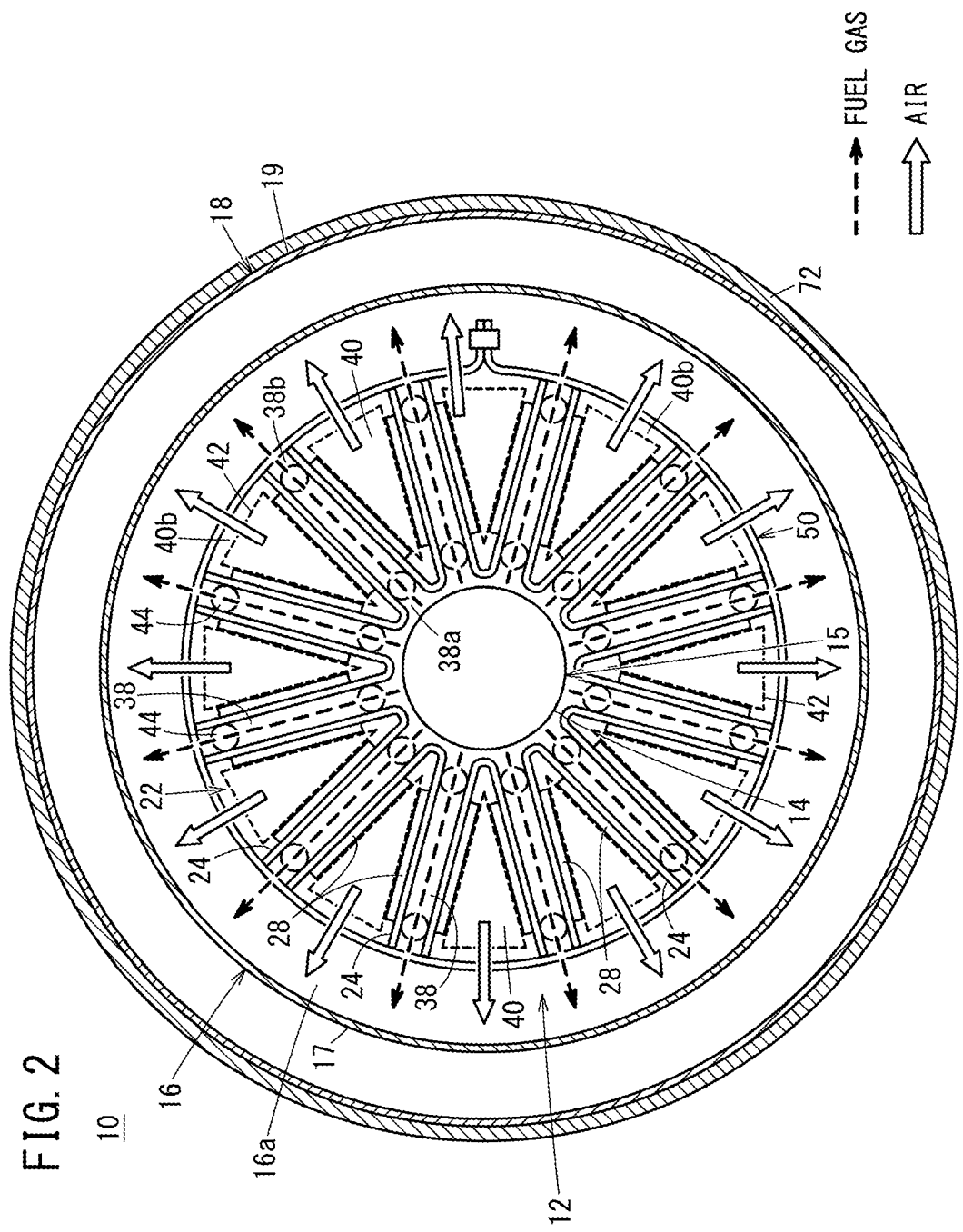
FIG. 2 is a cross sectional view in a horizontal direction, showing the fuel cell system.

In FIG. 2, the fuel cell module 12 is in the form of a solid oxide fuel cell. The fuel cell module 12 includes a plurality of power generation cells 20 for generating electricity by electrochemical reactions of the fuel gas and the oxygen-containing gas. The plurality of power generation cells 20 are stacked together in a circle, and a tightening load (stacking load) is applied to the power generation cells 20 in a circumferential direction. Each of the power generation cells 20 has a V-shape, and a peak of the V-shaped power generation cell 20 is oriented to the center of the fuel cell module 12. A plurality of power generation cells 20 are arranged in a circle to form an annular structural body 22. Specifically, as shown in FIG. 1, two annular structural bodies 22 are provided. Hereinafter, as necessary, one of the annular structural bodies 22 will be referred to as the "first annular structural body 22A", and another of the annular structural bodies 22 will be referred to as the "second annular structural body 22B".

Figure 3:
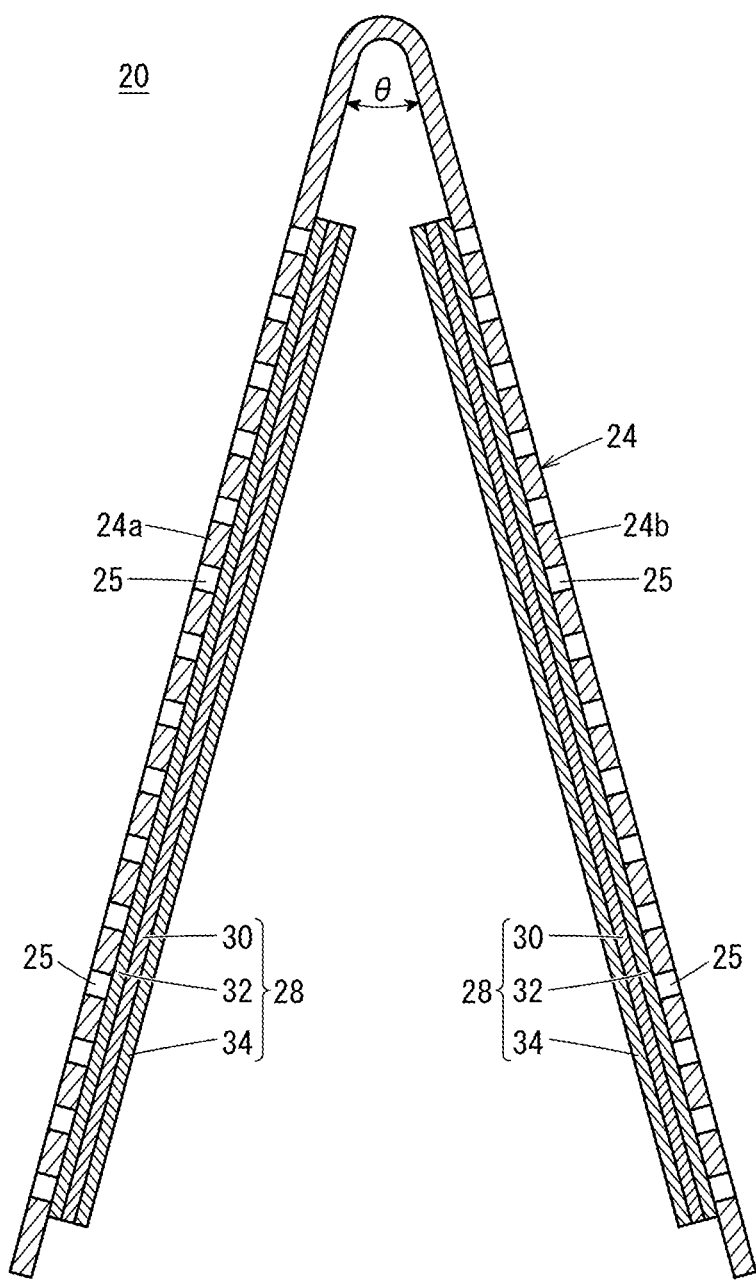
FIG. 3 is a view showing structure of a power generation cell.

As shown in FIG. 3, each of the power generation cells 20 includes a V-shaped base plate 24 having a first plate part 24a and a second plate part 24b extending in directions intersecting with each other, and electrolyte electrode assemblies 28 supported by the base plate 24. The base plate 24 is an electrically conductive member. For example, the base plate 24 is a metal plate. The base plate 24 is formed by bending a rectangular plate to have a V-shape. For example, the V-shape angle θ of the base plate 24 (angle formed by the first plate part 24a and the second plate part 24b) is in the range between 1° and 45°. The V-shape angle θ of the base plate 24 is, preferably, not more than 60°, more preferably, not more than 45°, still more preferably, not more than 30°, and even still more preferably, not more than 15°.

The electrolyte electrode assemblies 28 are provided inside the V-shaped base plate 24. Specifically, the electrolyte electrode assemblies 28 are provided on the inner surfaces of the first plate part 24a and the second plate part 24b, respectively. Each of the electrolyte electrode assembly 28 includes an electrolyte 30 (solid electrolyte), an anode 32 provided on one surface of the electrolyte 30, and a cathode 34 provided on the other surface of the electrolyte 30. For example, the electrolyte 30 is made of oxide ion conductor such as stabilized zirconia. Each of the anode 32 and the cathode 34 is made of porous ceramics having suitable electrical conductivity and ion conductivity.

The anode 32 is provided in the inner surface of the base plate 24. The cathode 34 is oriented to the inside of the V-shaped base plate 24. The cathode 34 of one of the electrolyte electrode assemblies 28 and the cathode 34 of the other of the electrolyte electrode assemblies 28 face each other, inside the base plate 24.

Figure 4A:
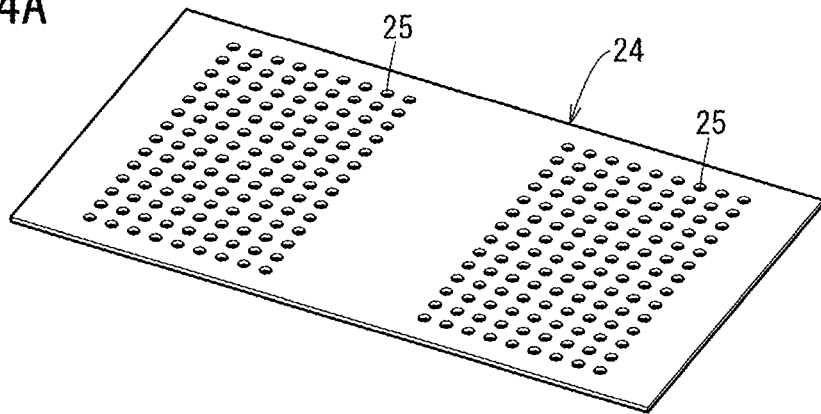
FIG. 4A is a first view showing a method of producing the power generation cell.
Figure 4B:
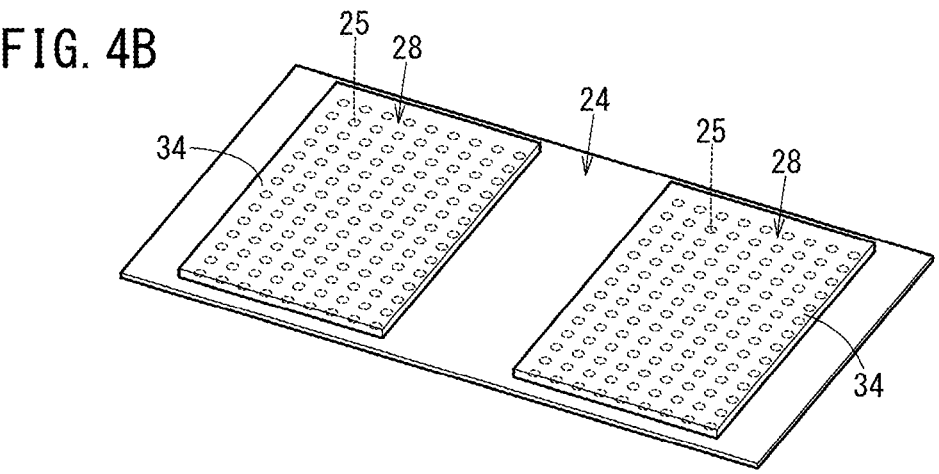
FIG. 4B is a second view showing a method of producing the power generation cell.
Figure 4C:
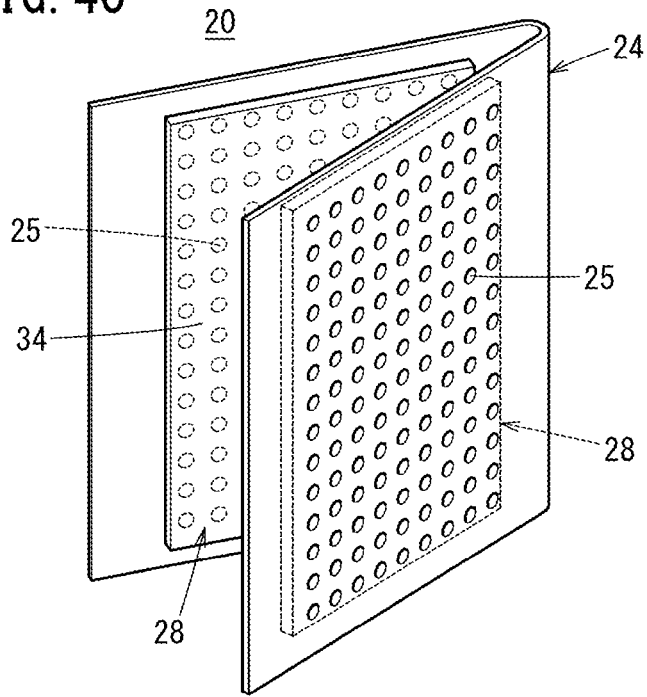
FIG. 4C is a third view showing a method of producing the power generation cell.

With reference to FIGS. 4A to 4C, an example of producing the power generation cell 20 will be shown. In FIG. 4A, a plurality of holes 25 are formed in a rectangular electrically conductive flat plate by laser processing, for example. The holes 25 are formed in a predetermined range on each of one side and the other side of the plate. As a result, the base plate 24 before bent to have a V-shape is formed. Next, as shown in FIG. 4B, two electrolyte electrode assemblies 28 are formed in the areas where a large number of the holes 25 are formed. The large number of holes 25 are inlet holes for guiding the fuel gas to the anode 32. Next, as shown in FIG. 4C, the base plate 24 is bent at the central part in a manner that the electrolyte electrode assemblies 28 are positioned inside the base plate 24. In this manner, the V-shaped power generation cell 20 is produced. It should be noted that the base plate 24 is not limited to the above structure. The base plate 24 may be formed of sintered metal, etc.

In FIG. 2, a fuel gas flow field 38 (first reactant gas flow field) is formed between the power generation cells 20 that are adjacent to each other, among the plurality of power generation cells 20, to allow the fuel gas to flow along the fuel gas flow field 38. The adjacent power generation cells 20 are arranged at predetermined intervals in the circumferential direction. A plurality of insulating spacers 44 are arranged between the power generation cells 20, for providing the fuel gas flow field 38 between the adjacent power generation cells 20, and preventing short circuiting between the adjacent base plates 24. The spacers 44 are arranged in a dot pattern or in a line pattern so as not to obstruct the flow of the fuel gas into the fuel gas flow field 38, and the flow of the fuel gas from of the fuel gas flow field 38.

In the inner circumferential portion of the annular structural body 22, a fuel gas inlet 38a is formed at an inner end of each of the plurality of power generation cells 20 for guiding the fuel gas into the fuel gas flow field 38. Therefore, a plurality of the fuel gas inlets 38a are formed in the circumferential direction at intervals, in the inner circumferential portion of the annular structural body 22. In the outer circumferential portion of the annular structural body 22, a fuel gas outlet 38b is formed between outer ends of the plurality of power generation cells 20, for discharging the fuel gas to the outside of the annular structural body 22 in the radial direction. Therefore, a plurality of the fuel gas outlets 38b are formed in the outer circumferential portion of the annular structural body 22 in the circumferential direction at intervals.

In FIG. 2, oxygen-containing gas flow fields 40 (second reactant gas flow field) are provided inside the power generation cells 20 (inside of the V-shaped base plate 24), respectively, to allow the oxygen-containing gas to flow along the oxygen-containing gas flow fields 40. Each of the oxygen-containing gas flow fields 40 is arranged in the axial direction of the annular structural body 22 made up of the plurality of power generation cells 20. The oxygen-containing gas flow field 40 extends through the annular structural body 22 in the axial direction. In the outer circumferential portion of the annular structural body 22, oxygen-containing gas outlets 40b are formed between the outer ends of the base plates 24, for discharging the oxygen-containing gas to the outside of the annular structural body 22 in the radial direction. Therefore, a plurality of the oxygen-containing gas outlets 40*b* are formed in the circumferential direction at intervals, in the outer circumferential portion of the annular structural body 22.

A triangular current collector 42 is provided inside each of the power generation cells 20. The current collector 42 contacts the two electrolyte electrode assemblies 28 (cathode 34) which face each other. The current collector 42 has gas permeability, and is made of an electrically conductive member. For example, the current collector 42 is formed of a mesh member, or a triangular prism formed by bending a metal plate having a large number of holes by machining. The current collector 42 receives a tightening load in the circumferential direction.

Figure 5:
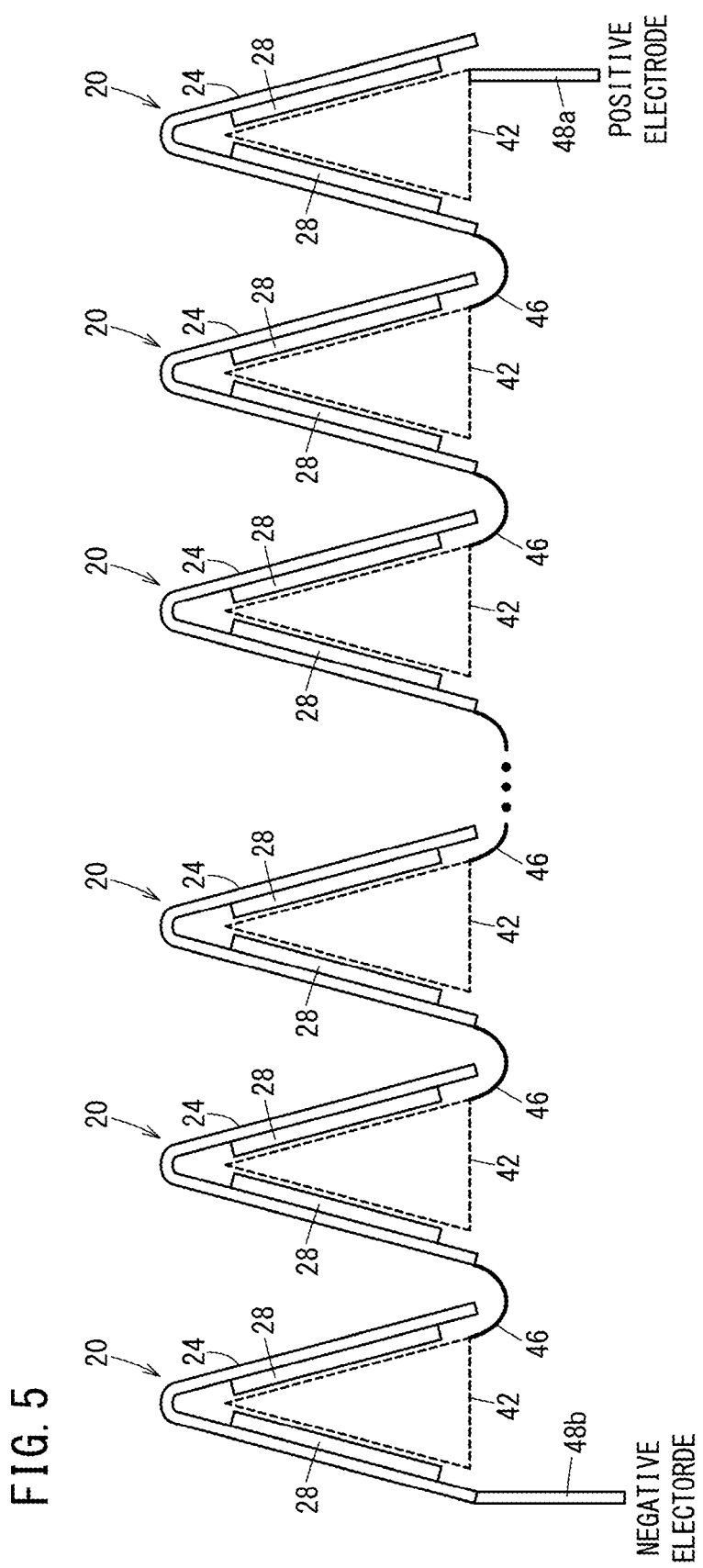
FIG. 5 is a view showing electrical connection between the power generation cells.

FIG. 5 shows electrical connection of a plurality of power generation cells 20. In the power generation cells 20 that are adjacent to each other, the base plate 24 of one of the power generation cells 20 and the current collector 42 of the other of the power generation cells 20 are electrically connected to each other by a conductive member 46. A positive electrode terminal 48*a* is provided for the power generation cell 20 at one end of the plurality of power generation cells 20, and a negative electrode terminal 48*b* is provided for the power generation cell 20 at the other end of the plurality of power generation cells 20.

Figure 6:
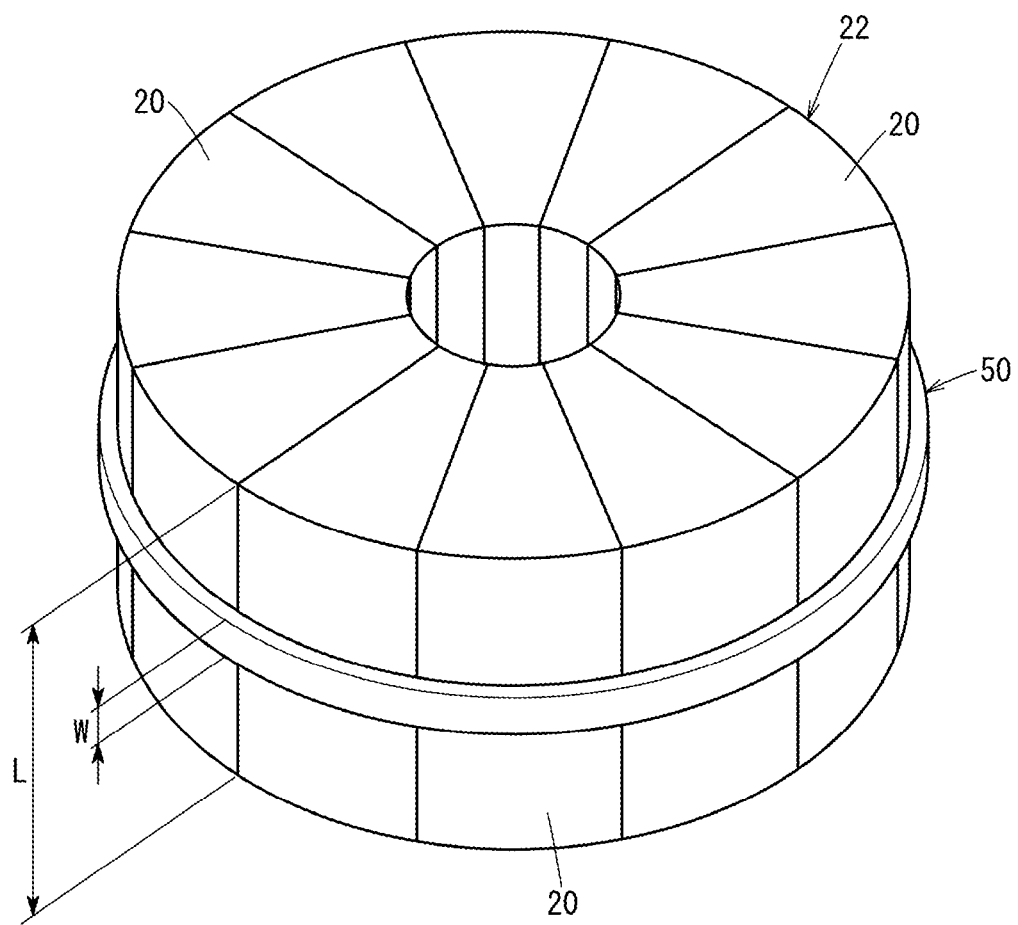
FIG. 6 is a view schematically showing an annular structural body and a tightening member.

In FIG. 2, a tightening member 50 for applying the tightening load to the plurality of the power generation cells 20 arranged in the circle is provided in the outer circumference of the annular structural body 22. The tightening member 50 is a member extending like a belt in the circumferential direction along the outer circumference of the annular structural body 22. As schematically shown in FIG. 6, the width W of the tightening member 50 is smaller than the length L (height) of the annular structural body 22 in the axial direction. In the structure, the tightening member 50 does not block the fuel gas outlets 38*b* and the oxygen-containing gas outlets 40*b* (see FIG. 2) formed in the outer circumferential portion of the annular structural body 22.

In FIG. 1, a plurality of the annular structural bodies (the first annular structural bodies 22A and the second annular structural body 22B) are stacked in an axial direction of the annular structural bodies 22 (vertical direction). The oxygen-containing gas flow fields 40 of the plurality of annular structural bodies 22 are connected together in the axial direction. A lower plate 52 is provided at the bottom (bottom surface) of the first annular structural body 22A. An upper plate 54 is provided at the upper part (upper surface) of the second annular structural body 22B. An intermediate plate 56 is provided between the first annular structural body 22A and the second annular structural body 22B. Each of the lower plate 52, the upper plate 54, and the intermediate plate 56 has a circular disk shape. The lower plate 52, the upper plate 54, and the intermediate plate 56 are made of insulating material. Alternatively, at least portions of the lower plate 52, the upper plate 54, and the intermediate plate 56 which contact the power generation cells 20 are covered with insulating material.

A plurality of gas holes 58 are formed in the lower plate 52 and the intermediate plate 56. The plurality of oxygen-containing gas flow fields 40 arranged in the circumferential direction are connected to the gas holes 58. The gas holes 58 of the lower plate 52 connect the inside (channel) of the heat exchanger 18 and the oxygen-containing gas flow field 40 in the power generation cells 20. The gas holes 58 of the intermediate plate 56 connect the oxygen-containing gas flow fields 40 of the first annular structural body 22A and the oxygen-containing gas flow fields 40 of the second annular structural body 22B.

Figure 7:
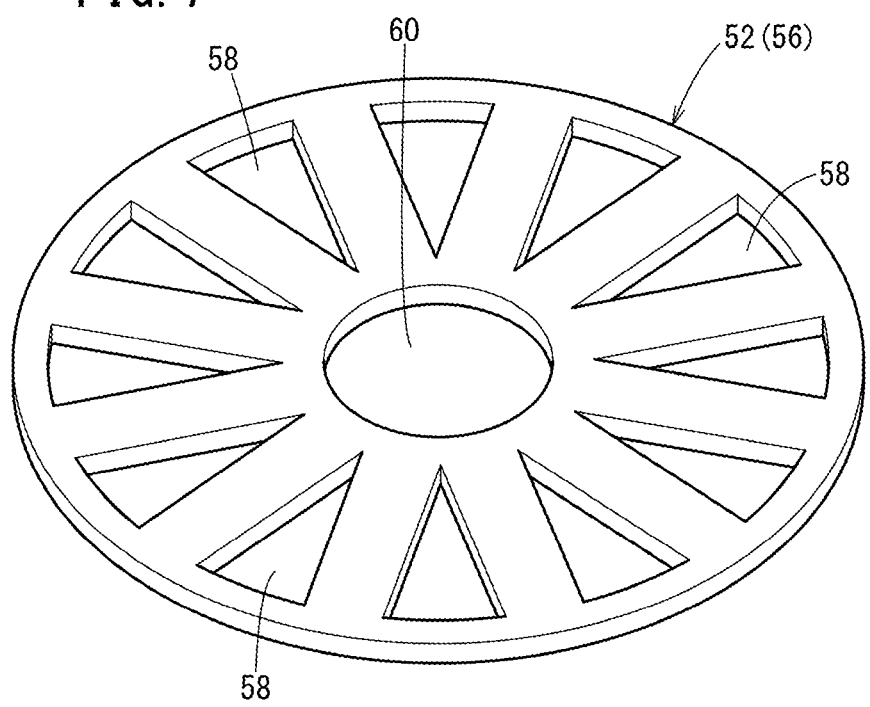
FIG. 7 is a perspective view showing a lower plate (intermediate plate)

As shown in FIG. 7, a central hole 60 is provided at the center of the lower plate 52. The reformer 14 (see FIG. 1) is inserted into the center of the lower plate 52. The plurality of gas holes 58 are provided around the central hole 60 in the circumferential direction at intervals. Each of the gas holes 58 has a triangular shape having the width which is decreased toward the central hole 60. The intermediate plate 56 also has the same structure as the lower plate 52. The gas holes 58 need not necessarily have the triangular shape. The gas holes 58 may have a circular shape or a rectangular shape.

Figure 8:
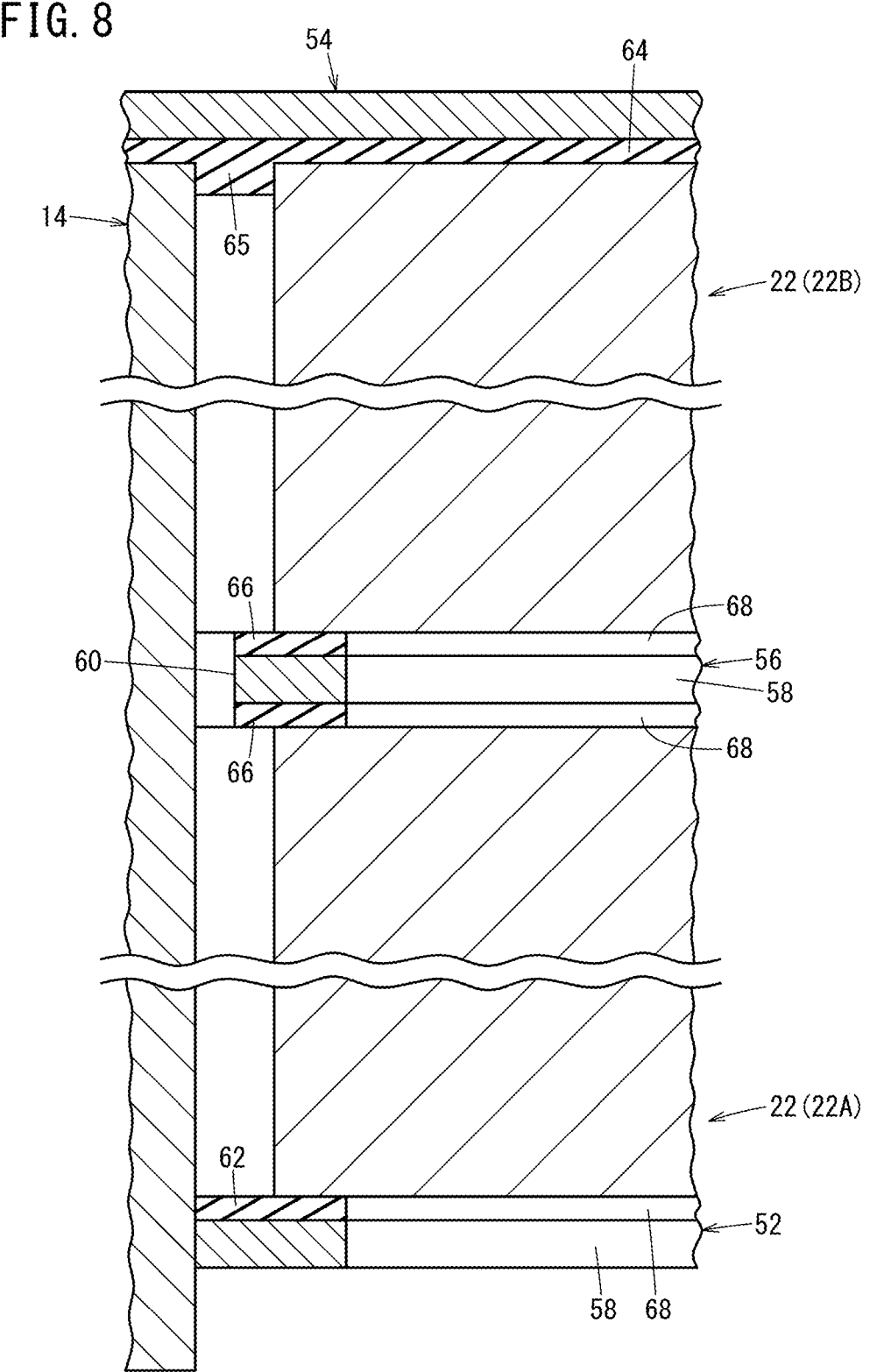
FIG. 8 is a cross sectional view in a vertical direction, showing the fuel cell module.

As shown in FIG. 8, gaskets 62, 64 made of elastic material for preventing leakage of the reactant gas are sandwiched between the first annular structural body 22A and the lower plate 52, and between the second annular structural body 22B and the upper plate 54. Further, gaskets 66 made of elastic material for preventing leakage of the reactant gas are sandwiched between the first annular structural body 22A and the intermediate plate 56 and between the second annular structural body 22B and the intermediate plate 56.

Each of the gaskets 62, 66 has a circular disk shape, and as in the cases of the lower plate 52 and the intermediate plate 56, a plurality of gas holes 68 are formed at intervals in the circumferential direction. The upper gasket 64 has a circular disk shape, and includes an annular projection 65 which protrudes downward. The annular projection 65 prevents inclination of the reformer 14, and prevents contact between the reformer 14 and the inner circumferential portion of the annular structural body 22 (inner end of the base plate 24). Instead of the annular projection 65, a ring shaped spacer which is separate from the gasket 64 may be provided.

In FIG. 1, the reformer 14 for reforming a raw material gas into the fuel gas is provided inside the annular structural body 22 made up of the plurality of power generation cells 20. For example, the raw material gas is a city gas containing hydrocarbon (methane gas, etc.). The reformer 14 is in the form of a hollow cylinder. A housing 15 (circumferential wall) of the reformer 14 is formed of a mesh member, or a porous member, and has gas permeability. For example, the housing 15 is formed of a metal member.

Though not shown, reforming catalyst is filled inside the reformer 14. As the reforming catalyst, at least one of catalyst metals of Ru (Ruthenium), Ni (Nickel), Pt (Platinum), Rh (Rhodium), Pd (Palladium), Ir (Iridium), and Fe (Iron) is used. The reformer 14 performs partial oxidation reforming of a mixed gas of raw material gas and air (air for partial oxidation which will be hereinafter referred to as the "POX air"), and generates a fuel gas supplied to the fuel cell module 12. Though not shown, the reformer 14 includes an ignition device such as a heater or a spark plug.

The combustor 16 has an annular shape around the fuel cell module 12. The combustor 16 includes a combustion chamber 16*a*. In the combustion chamber 16*a*, the fuel gas and the oxygen-containing gas (oxygen in the air) discharged from the fuel cell module 12 are combusted. The combustor 16 includes an inner partition wall 17 (first partition wall) facing the outer circumferential portion of the fuel cell module 12. The combustion chamber 16*a* is formed inside the inner partition wall 17.

The heat exchanger 18 is an air preheater for preheating the air to be supplied to the fuel cell module 12. The heat exchanger 18 has an annular shape around the combustion chamber 16*a*. The heat exchanger 18 performs heat exchange between the combustion gas produced in the combustion chamber 16*a* and air supplied to the fuel cell module 12 to heat (preheat) the air. Heat exchange between the combustion gas and the air is performed through the inner partition wall 17. The heat exchanger 18 includes an outer partition wall 19 (second partition wall) facing the outer circumferential portion of the combustion chamber 16a. Heat insulating material 72 is provided outside the heat exchanger 18. Component parts (not shown) such as a pump and an ECU (Electronic Control Unit) are provided at upper positions of the heat exchanger 18.

Operation of the fuel cell system 10 including the fuel cell module 12 having the structure as described above will be described below.

During operation of the fuel cell system 10, the raw material gas and the POX air are supplied to the reformer 14, and air as the oxygen-containing gas are supplied to the heat exchanger 18. Partial oxidation reforming of the raw fuel gas such as the city gas (containing $CH_4$, $C_2H_6$, $C_3H_8$, $C_4H_{10}$) is performed in the reformer 14, and the fuel gas which is a reformed gas containing hydrogen and carbon monoxide is obtained. Partial oxidation reaction performed in the reformer 14 is an exothermic reaction. Therefore, reduction of start-up time is facilitated. The fuel gas produced in the reformer 14 flows radially out of the reformer 14 toward the annular structural body 22 (the plurality of power generation cells 20) provided outside the reformer 14, and the fuel gas is supplied to the fuel gas flow field 38 formed between the power generation cells 20. Then, the fuel gas is supplied to each anode 32 through a large number of holes 25 formed in the base plate 24 (see FIG. 3).

In the meanwhile, the air supplied to the heat exchanger 18 is heated by the combustion gas in the combustor 16 (heat exchange between the air and the combustion gas is performed). The air heated to have hot temperature is supplied to the oxygen-containing gas flow fields 40 of the fuel cell module 12. Specifically, the hot air flows into the oxygen-containing gas flow fields 40 formed inside the plurality of the power generation cells 20 of the first annular structural body 22A, through the gas holes 58 of the lower plate 52 provided at the lower position of the first annular structural body 22A. Further, the air flows into the oxygen-containing gas flow fields 40 formed inside the plurality of power generation cells 20 of the second annular structural body 22B through the gas holes 58 of the intermediate plate 56. As a result, the air is supplied to each cathode 34.

Therefore, in each of the power generation cells 20 in the fuel cell module 12, power generation is performed by electrochemical reactions of the fuel gas and the air. The fuel gas and the air which have not been consumed at the anode 32 and the cathode 34 flow out of the outer circumferential portions (the fuel gas outlets 38b and the oxygen-containing gas outlets 40b) of the fuel cell module 12 (the first annular structural body 22A and the second annular structural body 22B), and the fuel gas and the air flow into the combustor 16. Thus, in the combustion chamber 16a of the combustor 16, the fuel gas and the air are mixed, and combusted to produce a combustion gas. The heat of the combustion gas is transmitted to the air flowing inside the heat exchanger 18 through the inner partition wall 17.

The fuel cell module 12 and the fuel cell system 10 offer the following advantages.

Since the plurality of power generation cells 20 are stacked in the circle, unlike the conventional flat stack type fuel cell module where the stacking load is applied using the end plates and the bolts, it is possible to reduce the number of component parts, and reduce the heat capacity. Thus, it is easy to increase the start-up speed. Further, since no gas seals between the power generation cells 20 are required, it is possible to simplify the gas seal structure. Since each of the power generation cells 20 has a V-shape, it is easy to improve the space efficiency.

Each of the plurality of power generation cells 20 includes the V-shaped base plate 24 including the first plate part 24a and the second plate part 24b extending in directions intersecting with each other. The electrolyte electrode assembly 28 is provided in each of the surfaces of the first plate part 24a and the second plate part 24b which face each other. In the structure, it is possible to achieve improvement in the output of power generation.

The first reactant gas flow field is provided between the adjacent power generation cells 20, among the plurality of power generation cells 20, to allow one of the fuel gas and the oxygen-containing gas to flow along the first reactant gas flow field. Further, the second reactant gas flow field is provided inside of each of the plurality of power generation cells 20, to allow the other of the fuel gas and the oxygen-containing gas to flow along the second reactant gas flow field. In the structure, no conventional bipolar separators are required, and it is possible to achieve the simple structure.

The reformer 14 for reforming the raw material gas into the fuel gas is provided inside the annular structural body 22 made up of the plurality of power generation cells 20. The first reactant gas flow field is the fuel gas flow field 38 to which the fuel gas is supplied. In the structure, it is possible to achieve improvement in the performance of discharging the fuel gas to each of the fuel gas flow fields 38 (suppress non-uniformity in gas distribution). Further, since it is possible to relatively reduce the length of the fuel gas flow fields 38 as the fuel gas manifolds, and the power generation areas (electrolyte electrode assemblies 28) is relatively close to the reformer 14, it is possible to achieve reduction of the start-up time.

The triangular current collector 42 in contact with the two electrolyte electrode assemblies 28 which face each other is provided inside each of the plurality of the power generation cells 20, and the current collector 42 receives the tightening load in the circumferential direction. In the structure, since the current collector 42 also serves as a load receiver member, it is possible to achieve reasonable structure.

The fuel cell system 10 includes the combustor 16 for combusting the fuel gas and the oxygen-containing gas discharged from the fuel cell module 12, and the heat exchanger 18 for performing heat exchange between the combustion gas produced in the combustor 16 and the oxygen-containing gas supplied to the fuel cell module 12 to preheat the oxygen-containing gas. The combustor 16 surrounds the fuel cell module 12, and the heat exchanger 18 surrounds the combustor 16. In the structure, since the combustor 16 surrounds the fuel cell module 12 from the outside, it is possible to heat the fuel cell module 12, and keep the temperature of the fuel cell module 12 efficiently. Further, since the heat exchanger 18 surround the combustor 16, it is possible to efficiently heat the oxygen-containing gas to be supplied to the fuel cell module 12. Further, during operation of the fuel cell system 10, the temperature of the fuel cell system 10 becomes low toward the outer circumferential side. Therefore, it is possible to relatively reduce the thickness of the heat insulating material 72 provided outside the heat exchanger 18, and reduce the amount of the used heat insulating material 72.

The fuel cell module 12 includes the plurality of annular structural bodies 22 each made up of the plurality of power generation cells 20, and the plurality of annular structural bodies 22 are stacked together in the axial direction of the annular structural bodies 22. The plurality of reactant gas flow fields are provided inside the plurality of power generation cells 20 of the annular structural body 22, to allow one of the fuel gas and the oxygen-containing gas to flow along the reactant gas flow fields. Each of the plurality of reactant gas flow fields extends in the axial direction of the annular structural body 22. In the structure, it is possible to easily increase the power generation output. Further, the same component parts can be used for generating different outputs.

Figure 9:
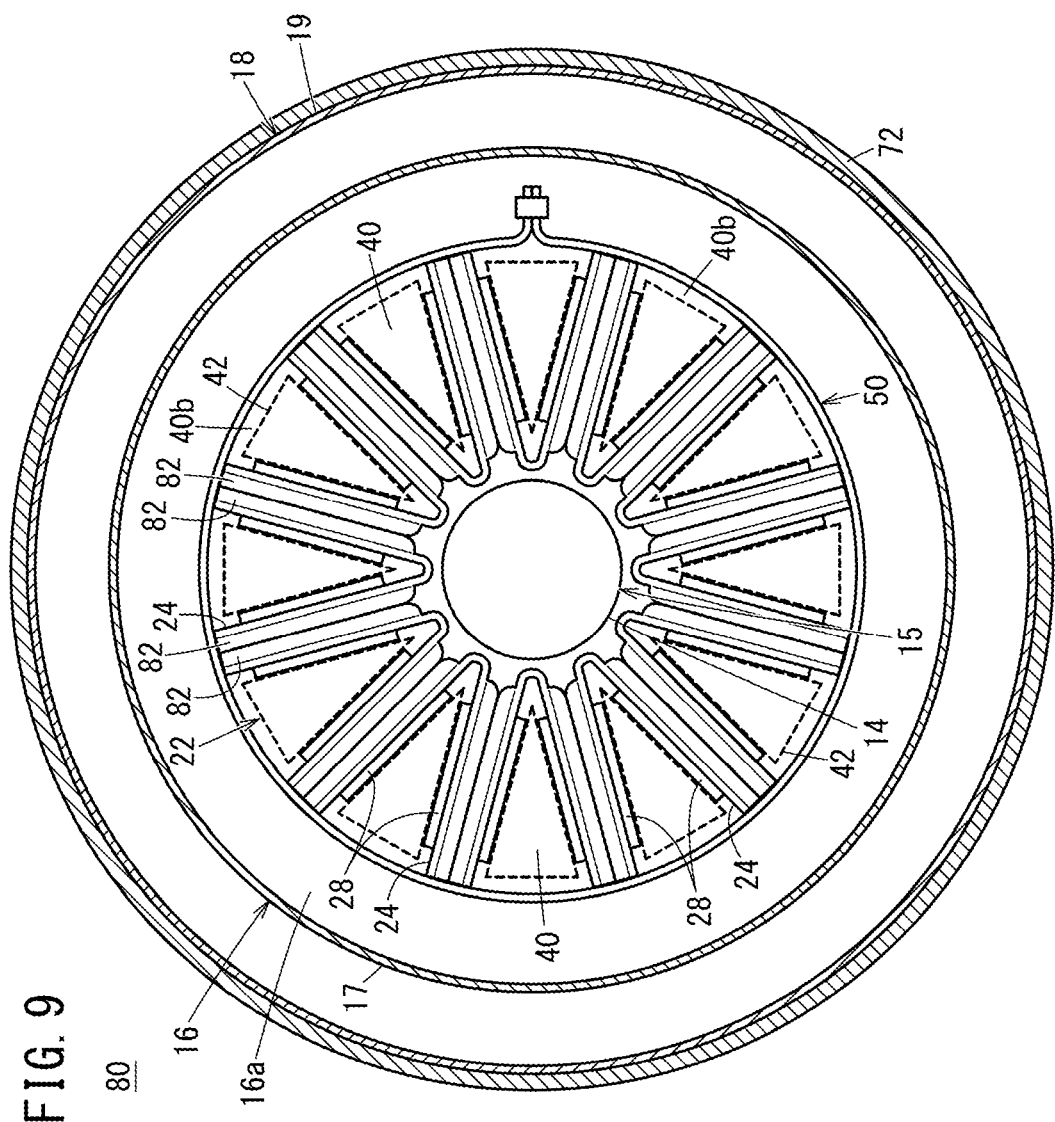
FIG. 9 is a cross sectional view showing a fuel cell module according to another structure.

In the fuel cell system 10 described above, a fuel cell module 80 having another structure shown in FIG. 9 may be adopted. In the fuel cell module 80, ridges 82 protruding outward are provided in each of the base plate 24, and the ridges 82 form the fuel gas flow field 38 (first reactant gas flow field).

Figure 10:
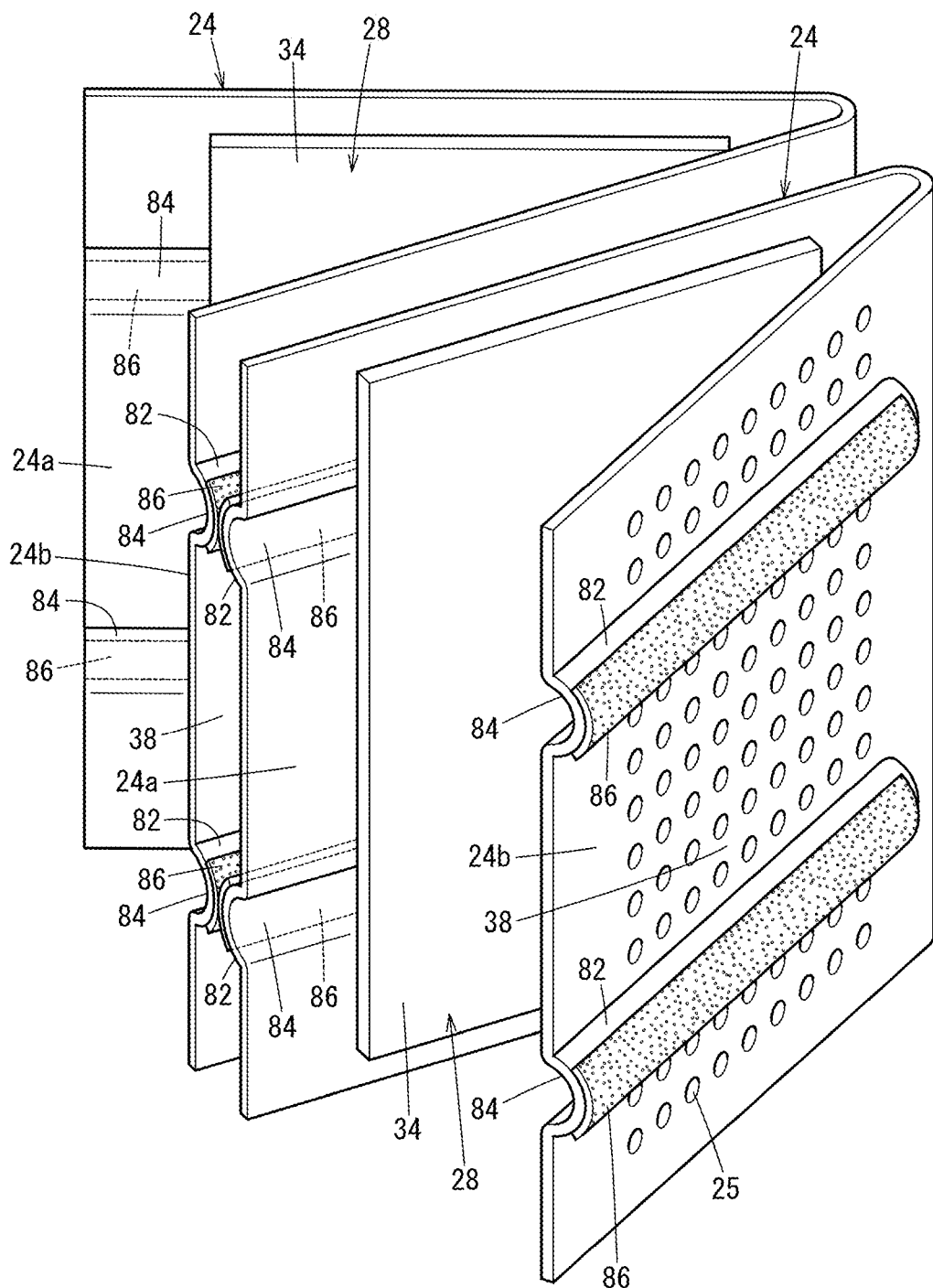
FIG. 10 is a perspective view showing a base plate of a fuel cell module shown in FIG. 9.

As shown in FIG. 10, the ridges 82 are provided in each of the first plate part 24a and the second plate part 24b. A plurality of (two) ridges 82 are arranged at an interval in a direction (axial direction of the annular structural body 22) perpendicular to a gas flow direction of the fuel gas flow field 38 (radial direction of the annular structural body 22), and extend in the gas flow direction. The fuel gas flow field 38 is formed between the ridges 82. The ridges 82 are formed in the base plate 24 by press forming. Therefore, recesses 84 are formed on the back of (opposite to) the ridges 82. The ridges 82 may be provided only on one of the first plate part 24a and the second plate part 24b.

Insulating material 86 of ceramics, etc. is provided on each of the ridges 82. Therefore, the ridges 82 of the adjacent base plates 24 are contact each other through the insulating material 86. The insulating material 86 is provided to cover at least a top of each of the ridges 82. The insulating material 86 is coated on the ridges 82. It should be noted that the insulating material 86 may be joined to the ridges 82 using adhesive, etc.

In this fuel cell module 80, the insulating material 86 is provided on the ridges 82 formed in the base plate 24 of the power generation cell 20. Therefore, with the simple structure, it is possible to provide the first reactant gas flow field (fuel gas flow field 38), and prevent short circuiting between the adjacent base plates 24.

The ridge 82 is provided in each of the first plate part 24a and the second plate part 24b. Therefore, it is possible to achieve the sufficient flow field cross sectional area of the first reactant gas flow field (fuel gas flow field 38).

The plurality of ridges 82 are provided at intervals in the direction perpendicular to the gas flow direction of the first reactant gas flow field (fuel gas flow field 38). Therefore, the gas flow in the first reactant gas flow field (fuel gas flow field 38) is not obstructed.

Since the insulating material 86 is coated on the ridges 82, it is possible to provide the insulating material 86 integrally with the ridges 82 easily.

The present invention is not limited to the above described embodiment. Various modifications may be made to the present invention.

What is claimed is:

1. A fuel cell module comprising a plurality of power generation cells each including an electrolyte electrode assembly and configured to perform power generation by utilizing a fuel gas and an oxygen-containing gas,
   wherein the plurality of power generation cells are stacked together in a circle, and a stacking load is applied to the plurality of power generation cells in a circumferential direction;
   each of the plurality of power generation cells comprises a V-shaped electrically conductive base plate including a first plate part and a second plate part extending in directions intersecting with each other;
   a first reactant gas flow field is provided between power generation cells that are adjacent to each other, among the plurality of power generation cells, to allow one of the fuel gas and the oxygen-containing gas to flow along the first reactant gas flow field;
   a ridge protruding outward is provided in the base plate to provide the first reactant gas flow field by the ridge; and
   insulating material is provided on the ridge.

2. The fuel cell module according to claim 1, wherein the ridge is provided in each of the first plate part and the second plate part.

3. The fuel cell module according to claim 1, wherein a plurality of the ridges are arranged at an interval in a direction perpendicular to a gas flow direction of the first reactant gas flow field, and extend in the gas flow direction.

4. The fuel cell module according to claim 1, wherein the insulating material is coated on the ridge.

5. A fuel cell system including a fuel cell module,
   wherein the fuel cell module comprises a plurality of power generation cells each including an electrolyte electrode assembly and configured to perform power generation by utilizing a fuel gas and an oxygen-containing gas;
   the plurality of power generation cells are stacked together in a circle, and a stacking load is applied to the plurality of power generation cells in a circumferential direction;
   each of the plurality of power generation cells comprises a V-shaped electrically conductive base plate including a first plate part and a second plate part extending in directions intersecting with each other;
   a first reactant gas flow field is provided between power generation cells that are adjacent to each other, among the plurality of power generation cells, to allow one of the fuel gas and the oxygen-containing gas to flow along the first reactant gas flow field;
   a ridge protruding outward is provided in the base plate to provide the first reactant gas flow field by the ridge; and
   insulating material is provided on the ridge.

* * * * *